Patented July 12, 1949

2,476,052

UNITED STATES PATENT OFFICE 2,476,052

ESTER EXCHANGE REACTION

Samuel B. Lippincott, Westfield, N. J., assignor to Standard Oil Development Company, a corporation of Delaware No Drawing. Application January 2, 1947, Serial No. 719,923

15 Claims. (Cl. 260—491)

This invention relates to an ester interchange process for the preparation of esters of secondary and tertiary alcohols.

Heretofore, the ester interchange reaction has been used to prepare esters of primary alcohols. Purdie, in 1885, used sodium alcoholates to accelerate the reaction between an alcohol and an ester. Reimer and Downes reported in J. Am. Chem. Soc. 43, 945 (1921), that attempts to form esters of benzoic acid by alcoholysis of methyl benzoate with secondary and tertiary alcohols, using potassium alcoholates as catalysts, were unsuccessful. Fehlandt and Adkins at J. Am. Chem. Soc. 57, 193 (1935), and Hatch and Adkins at J. Am. Chem. Soc. 59, 1694 (1937), studied extensively the replacement of R' in AcOR' by various R groups in ROH. R and R' were primary and secondary. The reactions were made in a closed system under pressure of hydrogen, sometimes as high as 100 atmospheres, and at high temperatures, the majority as high as 200° C. The reaction time was generally 70 hours. In a few cases a small amount of aluminum ethoxide was used as a catalyst and in the majority of cases water was present in the reaction mixture. In the cases where R' was a secondary radical the acetate was reacted with ethanol, i. e., R was primary. The reaction of a secondary alcohol and a secondary alkyl acetate was not studied. Reactions of tertiary alcohols were studied only by Reimer and Downes and attempts to achieve alcoholysis with tertiary alcohols were reported unsuccessful.

Normally acid catalysts are used in esterification reactions but such catalysts are unsuitable in cases where secondary and tertiary alcohols are esterified, since these alcohols tend to dehydrate to the corresponding olefins.

It is thus indicated in the prior art that secondary and tertiary alcohols have been found very difficult to esterify by means of an ester-exchange reaction.

It has now been found that the esters of secondary and tertiary alcohols are much more powerful esterification agents for other alcohols than are the esters of primary alcohols.

It has been discovered, more specifically, that esters of secondary alcohols may be readily and efficiently prepared by an ester interchange reaction between a secondary alcohol and an ester capable of yielding a secondary or tertiary alcohol on saponification and that, correspondingly, esters of tertiary alcohols may be prepared from the reaction between a tertiary alcohol and an ester capable of yielding a tertiary alcohol upon saponification.

This invention has for an object the preparation of esters of secondary and tertiary alcohols.

Another object of this invention is to prepare esters of secondary and tertiary alcohols by an ester interchange reaction catalyzed by a neutral to basic catalyst.

Still another object of this invention is to secure high yields of esters of secondary and tertiary alcohols.

Another and further object of this invention is to prepare esters of secondary and tertiary alcohols in a simple and efficient way and with simple equipment.

This invention is practiced by mixing the secondary or tertiary alcohol to be esterified with an ester which is capable of yielding upon saponification a secondary or tertiary alcohol and adding a catalyst to the mixture. The alcohols used are of a class other than the class of primary alcohols and may be characterized in another way in that the alcohols have less than two hydrogen atoms on the alcohol carbon atom bonded to the hydroxyl oxygen. This carbon atom is preferably aliphatic, i. e., it is a part of an aliphatic carbon chain, either open or cyclic, as in cyclohexanol, etc. The esters likewise are such that upon saponification an alcohol would be obtained which is of the same class as the above-described free alcohol; it also is one of the class other than the class of primary alcohols, and also has less than two hydrogen atoms on the carbon atom bonded to the hydroxyl oxygen. While the free alcohol and that obtainable from the ester by saponification, preferably both belong to the same class, that is, they are both secondary or are both tertiary, these alcohols may belong to different classes within the limits defined above.

The preferred catalyst is basic and preferably is an alcoholate of a metal such as sodium, potassium, lithium, calcium, magnesium or aluminum. The alcoholate is preferably made from either the alcohol used in the reaction or from an alcohol which would be obtained by the saponification of the ester used in the reaction although alcoholates of other alcohols, particularly of lower boiling alcohols than either of these, such as sodium methoxide, may also be used. The preferred procedure generally is to add the metal directly to the reaction mixture so that the alcoholate is formed in situ, thereby avoiding the addition of other alcohol radicals. It has been found advantageous to add additional amounts of the catalyst at intervals during the reaction. The process may also be conducted under appropriate conditions with other substantially neutral to basic catalysts heretofore used in ester-exchange reactions. Such catalysts include naphthenates, stearates, oleates, linoleates, abietates, resinates, etc. of Ca, Ba, Sr, Pb, Cd, Ce, and Zn. Tertiary amines are also included, as are metal surfaces such as Pt, Cu, Ni, German Silver, brass, steel, soft iron, and ordinary steel.

It is preferred that the reactants and conditions be chosen such that the reaction can be carried to completion by the removal of one of the reaction products. This is ordinarily accomplished by choosing an ester such that the alcohol resulting from the ester interchange will be lower boiling than the alcohol originally added to the reaction mixture. By practicing the invention in this manner the alcohol resulting from the ester interchange reaction is capable of being distilled from the reaction mixture during the course of the reaction, thus shifting the equilibrium in the desired direction.

The temperature at which the reaction is carried out is subject to wide variation depending upon the reactants and the catalysts chosen. When the reactants are of a high molecular weight, the temperature of the reaction is correspondingly high. When the invention is practiced according to the preferred procedure, given above, the temperature of the reaction is regulated so that the alcohol formed by the ester interchange will distill from the reaction mixture.

An azeotrope of the reagent alcohol and the ester formed by the ester interchange may be formed or an azeotrope may be formed by the alcohol resulting from the ester interchange and the ester component of the reaction mixture; in this event, the temperature of the reaction mixture will be that of the temperature at which the azeotrope formed distills. If during the course of the reaction, either one of the two types of azeotrope, mentioned above, is formed, part of one of the reactants will be removed from the reaction mixture with the result that the yield of the desired ester will be correspondingly low and in order to secure an adequate yield it is necessary where an azeotrope is formed to add to the reaction mixture an additional amount of the reactant which goes to make up the azeotrope. For example, in the event that the alcohol formed by the ester interchange forms an azeotrope with the ester reagent, it is preferred to add twice as much of the ester to the reaction mixture as alcohol based on molal proportions.

This invention is capable of broad application and is not limited to any particular molecular weight of either the alcohol or the ester components of the reaction mixture. It may be practiced when the molecular weights of the two original constituents are very large and in this case it is desirable to conduct the reaction under reduced pressure, whereby when the invention is practiced according to the preferred procedure, the alcohol formed may be distilled from the reaction mixture at reduced pressure. When the reactants are of a high molecular weight and the differential in the boiling points of the alcohol component of the reaction mixture and the alcohol produced by the ester interchange is small, the reaction may be conducted at atmospheric pressure by heating the reaction mixture for a sufficient period of time to bring the reaction to the equilibrium point, and then the alcohols present may be distilled from the reaction mixture under reduced pressure and the esters may subsequently be fractionated under reduced pressure.

*Example 1.—Secondary-butyl acetate*

100 ml. (1.1 moles) of secondary butyl alcohol and 250 ml. (2.1 moles) of isopropyl acetate and 1 gr. of metallic sodium were charged into a flask and heated to the point where distillation started. The heating was continued to distill from the reaction mixture an azeotrope of isopropyl acetate and isopropyl alcohol. The take-off was regulated so that the vapor temperature did not exceed 82° C., which is the boiling point of the azeotrope. The distillation was very slow during the first 8-hour period. The mixture was cooled somewhat and an additional 1 gr. portion of metallic sodium was added. The reaction mixture was again heated and the azeotrope distilled readily at 82° C. 150 ml. of azeotrope were obtained during the 8 hours. The reaction mixture was cooled, filtered and distilled. The main fraction of 83 gr. was collected at 110 to 111° C. This fraction was redistilled and it substantially distilled at 112° C. The index of refraction $N_D^{20}$ was 1.3884. The literature gives the boiling point of secondary butyl acetate as 112° C. and its refractive index $N_D^{20}$ as 1.389.

*Example 2.—Tertiary-amyl acetate*

Tertiary-amyl alcohol (2-methyl-2-butanol) was purified by refluxing 10 parts of the commercial grade of refined tertiary-amyl alcohol with about 1 part of sodium methoxide and distilling the resulting mixture using an efficient fractionating column. The fraction distilling at 101–103° C. was used for the esterification experiment.

This purified tertiary-amyl alcohol (176 g.), tertiary-butyl acetate (348 g.), and sodium methoxide (1 g.) were mixed in a flask and distilled using an efficient fractionating column operating at a high reflux ratio. The rate of takeoff was regulated so that the vapor temperature did not rise above 85° C. (Tertiary-butyl alcohol boils at 83°.) After a period of eight hours, the reaction mixture was cooled, fresh catalyst was added, and the distillation continued for another period of eight hours. This was repeated twice. During the fourth period it became impossible to keep the temperature below 85° C. except at total reflux. The temperature was, therefore, allowed to rise slowly until it reached 120° C. The flask was transferred to a short Vigreaux type column, and the distillation continued at reduced pressure without attempting further fractionation. The distillate so obtained (196.5 g.) was crude tertiary-amyl acetate. Fractionation of this, using an efficient column, yielded pure tertiary-amyl acetate (171.5 g., 67% yield) distilling at 124–5° C. The saponification number was determined and found to be 418 mg. KOH/g. The theoretical saponification number for tertiary-amyl acetate is 431.

The yield can be increased considerably by the recovery of the unreacted materials.

*Example 3.—Tertiary-hexyl acetate*

Dimethyl-n-propylcarbinol (100 g.), tertiary-butyl acetate (200 cc.), and sodium (0.1 g.) were mixed in a flask and distilled using an efficient fractionating column. After the first few drops of distillate had been removed, the temperature rose to above 85° C. and would not drop to below 85° C. even at total reflux. The mixture was refluxed for a total of 20 hours. Still there was no evidence of reaction. The mixture was cooled, some stainless steel turnings and sodium methoxide (½ g.) were added. Distillation now proceeded at a fairly rapid rate without the temperature rising above 85°. After a period of four or five hours it became necessary to reduce the rate of take-off, and finally it became impossible to keep the temperature below 85° C. even at total reflux. Apparently the reaction had gone to completion. Distillation was continued until vapor temperature reached 130°. The pressure was reduced to 45–50 mm., and a fraction (80 g.) collected at 60–65° C. This had a saponification number of 380 mg. KOH/g. The flask containing the residue was transferred to a Vigreaux type column and distilled to dryness at reduced pressure. The distillate (19 g.) had a saponification number of 385. The theoretical for tertiary-hexyl acetate is 389. The two fractions (99 g.) represents a yield of 70%. This can be increased by recovery of unreacted materials.

It is understood that this invention is not to be limited to the foregoing material in the nature of examples but is to be considered broadly as defined by the breadth of the appended claims.

What is claimed and sought to be secured by Letters Patent is:

1. A process for making an ester which comprises mixing together and heating at substantially atmospheric pressure under reflux, in the presence of a neutral to basic ester-exchange catalyst, an alcohol and an ester of a different and relatively more volatile alcohol wherein both have less than two hydrogen atoms on the carbon atom bonded to the hydroxyl oxygen and removing a distillate fraction comprising said more volatile alcohol.

2. A process for making an ester which comprises mixing together and heating at substantially atmospheric pressure under reflux, in the presence of an alcoholate of an alkali metal, an aliphatic alcohol of a class other than the class of primary alcohols and an ester capable of yielding upon saponification a different aliphatic alcohol of the same class and relatively more volatile than the first alcohol and removing a distillate fraction comprising said more volatile alcohol.

3. A process for making an ester which comprises mixing together and heating at substantially atmospheric pressure under reflux, in the presence of an alcoholate of an alkaline earth metal, an aliphatic alcohol and an ester of a different and relatively more volatile aliphatic alcohol wherein both have less than two hydrogen atoms on the carbon atom bonded to the hydroxyl oxygen and removing a distillate fraction comprising said more volatile alcohol.

4. A process for making an ester which comprises mixing together and heating at substantially atmospheric pressure under reflux, in the presence of a basic ester-exchange catalyst, an aliphatic alcohol and an ester of a different and relatively more volatile aliphatic alcohol wherein both have less than two hydrogen atoms on the aliphatic carbon atom bonded to the hydroxyl oxygen and removing a distillate fraction comprising said more volatile alcohol.

5. A process for making an ester which comprises mixing together and heating at substantially atmospheric pressure under reflux, in the presence of an alcoholate of an alkali metal, an aliphatic alcohol of a class other than the class of primary alcohols and an ester capable of yielding an aliphatic alcohol of the same class and having a lower boiling point than the first alcohol.

6. A process for making an ester in which an alcohol is produced which comprises mixing together and heating at substantially atmospheric pressure under reflux, in the presence of a neutral to basic ester-exchange catalyst, an aliphatic alcohol and an ester of a different and relatively more volatile aliphatic alcohol wherein both alcohols have an equal number and less than two hydrogen atoms on the carbon atom bonded to the hydroxyl oxygen and removing a distillate fraction comprising said more volatile alcohol.

7. A process for making an ester in which an alcohol is produced which comprises mixing together and heating, in the presence of a neutral to basic ester-exchange catalyst, an aliphatic alcohol and an ester of a different aliphatic alcohol wherein both alcohols have less than two hydrogen atoms on the carbon atom bonded to the hydroxyl oxygen and wherein the reagent alcohol has a higher boiling point than the alcohol produced, and distilling the alcohol produced from the mixture during the reaction.

8. A process for making an ester of a secondary alcohol in which a secondary alcohol is produced which comprises mixing together and heating, in the presence of a neutral to basic ester-exchange catalyst, a secondary aliphatic alcohol and an ester capable of yielding a secondary aliphatic alcohol upon saponification, wherein the reagent secondary alcohol has a higher boiling point than the secondary alcohol produced, and distilling the lower boiling alcohol product from the mixture during the reaction.

9. A process for making an ester of a tertiary alcohol in which a tertiary alcohol is produced which comprises mixing together and heating, in the presence of a neutral to basic ester-exchange catalyst, a tertiary aliphatic alcohol and an ester capable of yielding a different tertiary aliphatic alcohol upon saponification, wherein the reagent tertiary alcohol has a higher boiling point than the tertiary alcohol produced, and distilling the lower boiling alcohol product from the mixture during the reaction.

10. The process for making an ester of a secondary aliphatic alcohol in which a tertiary aliphatic alcohol is produced which comprises mixing together and heating, in the presence of a neutral to basic ester-exchanging catalyst, a secondary aliphatic alcohol and an ester capable of yielding a tertiary aliphatic alcohol upon saponification.

11. The process for making an ester of a secondary aliphatic alcohol in which a tertiary aliphatic alcohol is produced which comprises mixing together and heating, in the presence of a neutral to basic ester-exchange catalyst, a secondary aliphatic alcohol and an ester capable of yielding a tertiary aliphatic alcohol upon saponification, wherein the reagent secondary alcohol has a higher boiling point than the tertiary alcohol produced, and distilling the tertiary alcohol product from the mixture during the reaction.

12. A process according to claim 1, in which the catalyst is sodium alcoholate.

13. A process according to claim 1, in which the catalyst is aluminum alcoholate.

14. A process according to claim 1, in which the catalyst is potassium alcoholate.

15. The process for preparing secondary butyl acetate comprising mixing together and heating under reflux in the presence of a sodium alcoholate catalyst, secondary butyl alcohol and isopropyl acetate, removing a distillate fraction comprising isopropyl alcohol during said heating operation and recovering a reaction product comprising secondary butyl acetate.

SAMUEL B. LIPPINCOTT.

REFERENCES CITED

The following references are of record in the file of this patent:

UNITED STATES PATENTS

| Number | Name | Date |
|---|---|---|
| 1,433,308 | Steffens | Oct. 24, 1922 |
| 2,177,407 | Hansley | Oct. 24, 1939 |
| 2,422,016 | Hull et al. | June 10, 1947 |

FOREIGN PATENTS

| Number | Country | Date |
|---|---|---|
| 421,063 | Great Britain | Dec. 13, 1934 |

OTHER REFERENCES

Baker, Journ. Amer. Chem. Soc., vol. 60, p. 2673, (1938). Copy in Scientific Library.